US011317389B2

(12) United States Patent
Liu et al.

(10) Patent No.: US 11,317,389 B2
(45) Date of Patent: Apr. 26, 2022

(54) DATA TRANSMISSION METHOD, APPARATUS, AND SYSTEM

(71) Applicant: HUAWEI TECHNOLOGIES CO., LTD., Guangdong (CN)

(72) Inventors: Jing Liu, Shanghai (CN); Yibin Zhuo, Shanghai (CN); Jun Wang, Shanghai (CN); Mingzeng Dai, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/039,830

(22) Filed: Sep. 30, 2020

(65) Prior Publication Data
US 2021/0022131 A1 Jan. 21, 2021

Related U.S. Application Data
(63) Continuation of application No. PCT/CN2019/081483, filed on Apr. 4, 2019.

(30) Foreign Application Priority Data

Apr. 4, 2018 (CN) .......................... 201810301055.4

(51) Int. Cl.
*H04W 72/04* (2009.01)
*H04W 4/46* (2018.01)
*H04W 72/08* (2009.01)

(52) U.S. Cl.
CPC ......... *H04W 72/0413* (2013.01); *H04W 4/46* (2018.02); *H04W 72/042* (2013.01);
(Continued)

(58) Field of Classification Search
CPC ............. H04W 72/04; H04W 72/0406; H04W 72/0413; H04W 72/042; H04W 72/0426;
(Continued)

(56) References Cited

U.S. PATENT DOCUMENTS 11,096,161 B2 * 8/2021 Wu ........................ H04W 48/10
2015/0282234 A1 10/2015 Sartori et al.
(Continued)

FOREIGN PATENT DOCUMENTS

CN 105188045 A 12/2015
CN 105191178 A 12/2015
(Continued)

OTHER PUBLICATIONS

Nokia, Nokia Shanghai Bell, On the PPPR for V2X packet duplication via multiple PC5 carriers. 3GPP TSG-RAN WG2 Meeting #101, Athens, Greece, Feb. 26-Mar. 2, 2018, R2-1803352, 3 pages.
(Continued)

*Primary Examiner* — Siu M Lee
(74) *Attorney, Agent, or Firm* — Womble Bond Dickinson (US) LLP

(57) ABSTRACT

A data transmission method, comprising: a terminal device at a transmit end sends information about a transmission reliability requirement of to-be-transmitted data to a radio access network device through a wireless communications interface; and the terminal device at the transmit end obtains a transmission resource that is configured by the radio access network device and that is required for sending the to-be-transmitted data on the wireless direct communications interface, and sends the data to the terminal device at the receive end by using the transmission resource.

16 Claims, 6 Drawing Sheets

(52) U.S. Cl.
CPC ..... *H04W 72/048* (2013.01); *H04W 72/0486* (2013.01); *H04W 72/085* (2013.01)

(58) Field of Classification Search
CPC .......... H04W 72/0433; H04W 72/048; H04W 72/0486; H04W 72/0493; H04W 72/06; H04W 72/08; H04W 72/085; H04W 4/40; H04W 4/46; H04W 76/14; H04W 28/04; H04L 67/12
See application file for complete search history.

(56) References Cited

U.S. PATENT DOCUMENTS

| | | | |
|---|---|---|---|
| 2016/0044707 A1 | 2/2016 | Folke et al. | |
| 2018/0332564 A1* | 11/2018 | Lee | H04W 4/40 |
| 2019/0045465 A1* | 2/2019 | Lee | H04W 56/001 |
| 2019/0158993 A1* | 5/2019 | Kwon | H04W 4/70 |
| 2019/0253927 A1* | 8/2019 | Mok | H04W 28/0226 |
| 2019/0387377 A1* | 12/2019 | Zhang | H04W 52/281 |
| 2020/0196279 A1* | 6/2020 | Thomas | H04W 4/40 |
| 2020/0404625 A1* | 12/2020 | Roth-Mandutz | H04L 1/08 |

FOREIGN PATENT DOCUMENTS

| | | |
|---|---|---|
| CN | 106664595 A | 5/2017 |
| CN | 107371182 A | 11/2017 |
| CN | 107534829 A | 1/2018 |
| CN | 107734480 A | 2/2018 |
| EP | 2861023 A1 | 4/2015 |
| EP | 3282794 A1 | 2/2018 |
| EP | 3355636 A1 | 8/2018 |
| WO | 2017049976 A1 | 3/2017 |

OTHER PUBLICATIONS

3GPP TS 22.186 V15.2.0 (Sep. 2017),3rd Generation Partnership Project;Technical Specification Group Services and System Aspects;Enhancement of 3GPP support for V2X scenarios;Stage 1(Release 15), total 16 pages.
Ericsson, Packet duplication for PC5. 3GPP TSG-RAN WG2 #101, Athens, Greece, Feb. 26 Mar. 2, 2018, R2-1803525, 4 pages.
Catt, Discussion on PPPR usage. 3GPP TSG-RAN WG2 #101, Athens, Greece, Feb. 26 Mar. 2, 2018, R2-1802114, 2 pages.
ZTE: "Discussion on carrier selection in PC5 CA", Oct. 9-13, 2017, R2-1711011, total 4 pages.

* cited by examiner

| Destination index 1 | LCG ID1 | Buffer size1 |
| Buffer size1 | Retransmission Num1/Reliability ID1 | R |
| Destination index 2 | LCG ID2 | Buffer size2 |
| Buffer size2 | Retransmission Num2/Reliability ID2 | R |

ё ё

| Destination index N | LCG ID N | Buffer size N |
| Buffer size N | Retransmission Num N/Reliability ID N | R |

DATA TRANSMISSION METHOD, APPARATUS, AND SYSTEM

CROSS-REFERENCE TO RELATED APPLICATIONS

This application is a continuation of International Application No. PCT/CN2019/081483, filed on Apr. 4, 2019, which claims priority to Chinese Patent Application No. 201810301055.4, filed on Apr. 4, 2018. The disclosures of the aforementioned applications are herein incorporated by reference in their entireties.

TECHNICAL FIELD

This application relates to the communications field, and more specifically, to a data transmission method, an apparatus, and a system.

BACKGROUND

Currently, a vehicle may obtain road condition information or receive an information service in time through vehicle to vehicle (V2V) communication, vehicle to infrastructure (V2I) communication, vehicle to pedestrian (V2P) communication, or vehicle to network (V2N) communication. The communication manners may be collectively referred to as V2X communication (X represents everything). A network used for the V2X communication is referred to as internet of vehicles. Internet of vehicles communication that is based on a cellular network is currently an important communication means, for example, V2X direct communication based on long term evolution (LTE) or 5th generation (5G) new radio (NR).

In existing LTE-based V2X direct communication, data is transmitted between a user equipment (UE) and another user equipment through an interface PC5 that is between the user equipment and the another user equipment and that is used for short-distance direct communication, and the data transmitted on the interface PC5 determines a scheduling priority of data when the data is transmitted on a transmission link (sidelink, SL) between two UEs supporting a proximity service (proximity service, ProSe) by using a prose per packet priority (PPPP) mechanism. In the PPPP mechanism, an application layer in the UE determines a PPPP value corresponding to to-be-transmitted data, and provides the determined PPPP value to an access stratum (AS) of the UE by using an inter-layer primitive. A PPPP may represent a scheduling priority of the to-be-transmitted data by using eight values, where a smaller value indicates a higher transmission scheduling priority. For sidelink transmission performed on the interface PC5, each logical channel ( ) is usually associated with one PPPP value. In a transmission resource allocation manner that is based on a transmission resource requested in real time and that is referred to as a mode 3, a base station delivers a mapping relationship between a logical channel group (LCG) and the PPPP to the UE by using a radio resource control (RRC) reconfiguration message. One LCG includes a plurality of LCs, each LC is associated with one PPPP, one LCG may be associated with a plurality of PPPPs, one LC Identifier (ID) corresponds to only one PPPP value, but one PPPP may be associated with different LCIDs. For example, an LCID 1 corresponds to a PPPP 1, and an LCID 2 may also correspond to the PPPP 1. In this way, the UE may report, to the base station based on the mapping relationship between the LCG and the PPPP by using information that is about the LCG and that is carried in a sidelink buffer status report (BSR), data that is of PPPP types, that corresponds to the LCG, and that needs to be transmitted.

A data transmission reliability mechanism of the interface PC5 uses a blind retransmission mechanism. The to-be-transmitted data is transmitted twice, and there is no hybrid automatic repeat request (HARQ) mechanism in a transmission process. Specifically, in the mode 3, the resource allocation manner is as follows.

The base station directly configures, for the UE at a data transmit end by using downlink control information 5A (DCI 5A), a time-frequency resource that is for initial data transmission and retransmission and that is on the sidelink.

A UE at a transmit end indicates, by using a sidelink control information format 1 (SCI format 1), a UE used as a data receive end to receive data on the time-frequency resource corresponding to the initial data transmission and retransmission.

In some scenarios, for example, automatic driving control or road emergency notification (if a vehicle accident occurs in a place, a surrounding vehicle is notified in advance for avoidance and the like), a higher requirement is proposed on the data transmission reliability. In the standard protocol document 3GPP TS 22.186 of a 3rd generation partnership project (3GPP) organization, it is also proposed that a transmission accuracy is required to reach 99.999%, but in a current mechanism, the transmission accuracy is only about 90%.

SUMMARY

In the background, a vehicle-mounted terminal device is used as an example. Data transmission reliability between two terminal devices cannot meet a requirement, for example, cannot meet a requirement that a data transmission accuracy can reach 99.999%. In view of this, this application provides a data transmission method, a communications apparatus (for example, a terminal device or a radio access network device), a system, and the like, to improve data transmission reliability.

According to a first aspect, an embodiment of this application provides a data transmission method. The method relates to information exchange and collaboration between a first terminal device, a second terminal device, and a radio access network device. It may be understood that execution of the method may be separately expressed and understood from perspectives of the first terminal device, the second terminal device, and the radio access network device. The method includes: sending, by the first terminal device, information about a transmission reliability requirement of to-be-transmitted data to the radio access network device through a wireless communications interface, where the to-be-transmitted data is data to be sent by the first terminal device to a second terminal device through a wireless direct communications interface, the wireless communications interface is a communications interface between the first terminal device and the radio access network device, and the wireless direct communications interface is a communications interface between the first terminal device and the second terminal device; and receiving, by the first terminal device, transmission resource information that is sent by the radio access network device and that is required for sending the to-be-transmitted data on the wireless direct communications interface. According to this solution, the terminal device sends the information about the reliability requirement of the to-be-sent data to the radio access network device, so that the radio access network device can configure, based on an actual reliability requirement of the to-be-transmitted data, a transmission resource required for sending the data on the wireless direct communications interface, for example, information about a time-frequency resource.

In an optional design of the first aspect, the transmission resource information required for sending the to-be-transmitted data on the wireless direct communications interface includes information about a transmission resource required for sending the to-be-transmitted data based on a quantity of times specified by the radio access network device. For example, based on the transmission reliability requirement corresponding to the to-be-transmitted data on the wireless direct communications interface, the radio access network device may determine to transmit the data for a plurality of times on the wireless direct communications interface, and notify the terminal device of a transmission resource (for example, a time-frequency resource) required for performing transmission for a plurality of times. Optionally, the radio access network device may also notify the terminal device of the determined quantity of times of transmitting the to-be-transmitted data on the wireless direct communications interface. According to this solution, reliability of the to-be-transmitted data may be ensured by flexibly configuring the quantity of transmission times, thereby effectively improving data transmission reliability, and facilitating data transmission in a scenario having a high reliability requirement.

In an optional design of the first aspect, the first terminal device sends first information to the radio access network device, where the first information is at least one of the following: information about link quality of the wireless direct communications interface, information about a load situation of the wireless direct communications interface; and information about a latency requirement of the to-be-transmitted data. After receiving the first information, the radio access network device may determine, based on the information about the transmission reliability requirement of the to-be-transmitted data and/or the first information, the quantity of times of transmitting the to-be-transmitted data on the wireless direct communications, and sends, based on the quantity of times specified by the radio access network device, information about a transmission resource required for sending the to-be-transmitted data, and the like. According to this solution, the terminal device sends at least one of the following information to a network side: the information about the link quality of the wireless direct communications interface, the information about the load situation of the wireless direct communications interface, and the information about the latency requirement of the to-be-transmitted data, so that when determining the quantity of times of transmitting the to-be-transmitted data on the wireless direct communications and the transmission resource (for example, the time-frequency resource) required by the transmission resource on the sidelink, the radio access network device may consider a reliability requirement of the to-be-transmitted data and may also consider requirements such as load and quality of a transmission link and a data transmission scheduling priority (such as a latency), so that overall performance of a system is optimize and resources of the system are more properly allocated and use. It may be understood that optionally, the radio access network device receives the transmission reliability requirement of the to-be-transmitted data and the first information. Considering at least one of the following cases: link quality of the wireless direct communications interface is good (for example, packet loss rarely occurs), load of the wireless direct communications interface is relatively light, and the to-be-transmitted data has a very strict low latency requirement, the radio access network device may not determine, based on the information about the transmission reliability of the to-be-transmitted data, a quantity of times for transmitting the to-be-transmitted data on a sidelink and/or a transmission resource required for the corresponding quantity of transmission times.

In an optional design of the first aspect, the first terminal device includes at least one of the following information in a buffer report of the wireless direct communications interface and sends the buffer report to the radio access network device: the information about the transmission reliability requirement of the to-be-transmitted data, the information about the link quality of the wireless direct communications interface, the information about the load situation of the wireless direct communications interface, and the information about the latency requirement of the to-be-transmitted data. In this way, the information is carried in a sidelink BSR, helping a network side properly and reliably determine, based on information such as a transmission reliability requirement, link quality, link load, and a transmission delay of the to-be-sent data, a quantity of times of transmitting the to-be-transmitted data on the wireless direct communications and a transmission resource required by the to-be-transmitted data on the wireless direct communications.

In an optional design of the first aspect, the first terminal device receives downlink control information from the radio access network device, where the downlink control information includes information about a transmission resource required for sending the to-be-transmitted data based on a quantity of times specified by the radio access network device. By using DCI of a physical layer message, the information about the transmission resource required for sending the to-be-transmitted data for the quantity of times specified by the radio access network device can be sent to the terminal device quickly and in real time, thereby ensuring efficiency of resource configuration and data transmission.

In an optional design of the first aspect, the information about the transmission reliability requirement of the to-be-transmitted data is obtained by an access stratum entity of the first terminal device from an application layer entity of the first terminal device. According to this design, an application layer of the terminal device transfers the reliability requirement of the to-be-transmitted data to an access stratum of the terminal device based on an actual requirement of a service that is performed, so that a quantity of data transmission times and/or a transmission resource configuration of the terminal device on a sidelink can be adapted to a reliability requirement of service data.

According to a second aspect, an embodiment of this application provides a data transmission method. The method relates to information exchange and collaboration between a first terminal device, a second terminal device, and a radio access network device. It may be understood that execution of the method may be separately expressed and understood from perspectives of the first terminal device, the second terminal device, and the radio access network device. The method includes: sending, by the first terminal device to the radio access network device through a wireless communications interface, information about a quantity of sending times required for sending to-be-transmitted data, where the to-be-transmitted data is data to be sent by the first terminal device to the second terminal device through a wireless direct communications interface, the wireless communications interface is a communications interface between the first terminal device and the radio access network device, and the wireless direct communications interface is a communications interface between the first terminal device and the second terminal device; and receiving, by the first terminal device, transmission resource information that is from the radio access network device and that is required for sending the to-be-transmitted data on the wireless direct communications interface. In a design of the method, the terminal device notifies the radio access network device of the quantity of transmission times required by the data that needs to be transmitted on the wireless direct communications interface, so that the radio access network device can configure a transmission resource based on the quantity of transmission times required by the to-be-transmitted data, and send, to the terminal device, the required transmission resource used to perform transmission for the specified quantity of times. Therefore, reliability of transmitting data on the wireless direct communications interface is improved, and transmission reliability requirements of different services are met.

In an optional design of the second aspect, the first terminal device determines, based on at least one of the following information, information about a quantity of sending times required for sending the to-be-transmitted data on the wireless direct communications interface: information about a transmission reliability requirement of the to-be-transmitted data, information about link quality of the wireless direct communications interface, information about a load situation of the wireless direct communications interface, and information about a latency requirement of the to-be-transmitted data. According to this design, when determining the quantity of times of transmitting the to-be-transmitted data on a wireless direct communications, the terminal device can consider not only a reliability requirement of the to-be-transmitted data, but also requirements such as load and quality of a transmission link and a transmission scheduling priority (for example, a latency) of the data, so that overall performance and resources of a system can be allocated and used more properly.

In an optional design of the second aspect, the information about the transmission reliability requirement of the to-be-transmitted data is obtained by an access stratum entity of the first terminal device from an application layer entity of the first terminal device. According to this design, an application layer of the terminal device transfers the reliability requirement of the to-be-transmitted data to an access stratum of the terminal device based on an actual requirement of a service that is performed, so that a quantity of data transmission times and/or a transmission resource configuration of the terminal device on a sidelink can be adapted to a reliability requirement of service data.

According to a third aspect, this application provides a radio access network device. The radio access network device includes units configured to perform each method or action performed by the radio access network device according to any one of the first aspect, the designs of the first aspect, the second aspect, and the designs of the second aspect. The units included in the radio access network device may be implemented in a software and/or hardware manner.

According to a fourth aspect, this application provides a terminal device. The terminal device includes units configured to perform each method or action performed by the first terminal device according to any one of the first aspect, the designs of the first aspect, the second aspect, and the designs of the second aspect. The units included in the terminal device may be implemented in a software and/or hardware manner.

According to a fifth aspect, this application provides a radio access network device. The radio access network device includes at least one processor and a communications interface. The communications interface may be used by the radio access network device to perform communication and interaction with at least one terminal device, for example, exchange control signaling and/or service data. The communications interface may be implemented through a circuit having a communication receiving and sending function. When a program instruction is executed in the at least one processor, the radio access network device is enabled to implement functions of the radio access network device according to any one of the first aspect, the designs of the first aspect, the second aspect, and the designs of the second aspect. Optionally, the radio access network device may further include a memory. The memory is configured to store a required program instruction and/or data.

According to a sixth aspect, this application provides a terminal device. The terminal device includes at least one processor and a communications interface. The communications interface may be used by the terminal device to perform communication and interaction with another device (for example, a radio access network device and/or another terminal device), for example, exchange control signaling and/or service data. The communications interface may be implemented through a circuit having a communication receiving and sending function. Alternatively, the communications interface may be designed as two circuits that have communication receiving and sending functions, respectively configured to perform communication and interaction between the terminal device and the radio access network device and perform communication and interaction between the terminal device and another terminal device. When a program instruction is executed in the at least one processor, the terminal device is enabled to implement functions of the radio access network device according to any one of the first aspect, the designs of the first aspect, the second aspect, and the designs of the second aspect. Optionally, the terminal device may further include a memory. The memory is configured to store a required program instruction and/or data. Optionally, the terminal device may be a vehicle in a transportation communications system (for example, V2X), or a communications apparatus or system that is installed in a vehicle, or a communications apparatus or system that is temporarily used for communication between the vehicle and the outside.

According to a seventh aspect, this application provides a computer-readable storage medium. The computer-readable storage medium includes program code. When the program code is executed, functions of the first terminal device or the radio access network device according to any one of the first aspect, the designs of the first aspect, the second aspect, and the designs of the second aspect are implemented. For example, the computer-readable medium may store program code to be executed by the first terminal device, and the program code includes an instruction used to perform a function of the first terminal device according to any one of the first aspect, the designs of the first aspect, the second aspect, and the designs of the second aspect. For another example, the computer-readable medium may store program code to be executed by the radio access network device, and the program code includes an instruction used to perform a function of the radio access network device according to any one of the first aspect, the designs of the first aspect, the second aspect, and the designs of the second aspect.

According to an eighth aspect, this application provides a computer program product, where the computer program product includes a program instruction, and when the program instruction is executed, functions of the first terminal device or the radio access network device according to any one of the first aspect, the designs of the first aspect, the second aspect, and the designs of the second aspect are implemented. For example, when the computer program product is executed on the first terminal device, the first terminal device is enabled to perform an operation of the terminal device according to any one of the first aspect, the designs of the first aspect, the second aspect, and the designs of the second aspect. For another example, when the computer program product is executed on the radio access network device, the radio access network device is enabled to perform an operation of the radio access network device according to any one of the first aspect, the designs of the first aspect, the second aspect, and the designs of the second aspect.

According to a ninth aspect, this application provides a system chip. The system chip includes at least one processor and an input/output interface. When an instruction is executed by the at least one processor, a function of the first terminal device or the radio access network device according to any one of the first aspect, the designs of the first aspect, the second aspect, and the designs of the second aspect is implemented. Optionally, the system chip may further include at least one memory and a bus, and the at least one memory is configured to store an instruction and/or data executed by the processor.

According to a tenth aspect, this application provides a communications system. The communications system includes the entity according to any one of the third aspect, the fourth aspect, the fifth aspect, the sixth aspect, the seventh aspect, the eighth aspect, and the ninth aspect.

BRIEF DESCRIPTION OF DRAWINGS

FIG. 4-1 is a schematic diagram of a scenario according to an embodiment of this application;

FIG. 4-2 is a schematic diagram of a data transmission method 400 according to an embodiment of this application;

DESCRIPTION OF EMBODIMENTS

The following describes technical solutions of this application with reference to the accompanying drawings.

The technical solutions in embodiments of this application may be applied to various communications systems, for example, a global system for mobile communications ( ), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) mobile communications system, a new radio (NR) system, and another network system that may be used to provide a mobile communications service. This is not limited herein.

A terminal device in the embodiments of this application may be user equipment ( ), an access terminal, a subscriber unit, a subscriber station, a mobile station, a mobile console, a remote station, a remote terminal, a mobile device, a user terminal, a terminal, a wireless terminal device, a user agent, a user apparatus, or the like. The terminal device may alternatively be a cellular phone, a cordless telephone set, a session initiation protocol (SIP) phone, a wireless local loop (WLL) station, a personal digital assistant (PDA), a handheld device with a wireless communications function, a computing device, or another processing device connected to a wireless modem, a vehicle-mounted device, a wearable device, a terminal device in a future 5G network, a terminal device in a future evolved public land mobile communications network (PLMN), or the like. In the embodiments of this application, an example in which the terminal device is a vehicle-mounted communications apparatus or a part of the vehicle-mounted communications apparatus is used as an example for description. However, a specific implementation form of the terminal device is not limited in the embodiments.

A radio access network device in the embodiments of this application may be a device configured to communicate with the terminal device. The network device may be a base transceiver station (BTS) in the global system for mobile communications (GSM) or the code division multiple access (CDMA) system, or may be a NodeB (NB) in the wideband code division multiple access (WCDMA) system, or may be an evolved NodeB (eNB or eNodeB) in the LTE system, or may be a radio controller in a scenario of a cloud radio access network (CRAN). Alternatively, the network device may be a relay node, an access point, a vehicle-mounted device, a wearable device, a network device in the future 5G network, a network device in the future evolved PLMN network, or the like. In the embodiments of this application, the base station is used as an example for description. This is not limited in the embodiments of this application.

Figure 1:
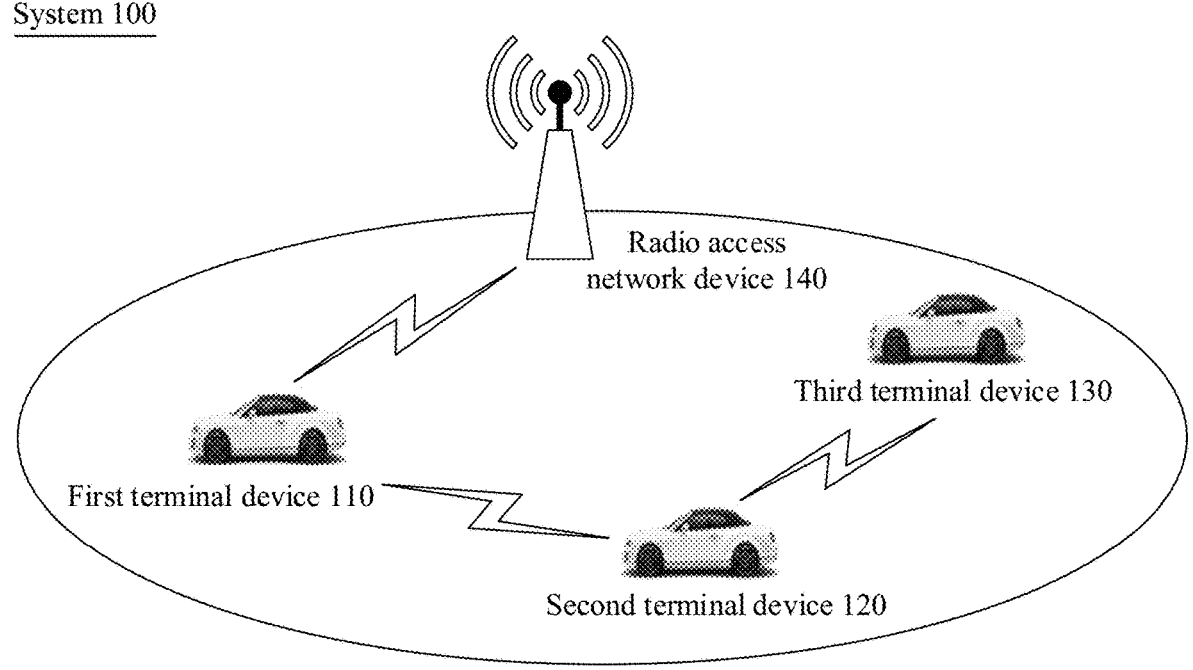
FIG. 1 is a schematic diagram of a communications system 100 applied to an embodiment of this application.

For ease of understanding the embodiments of this application, a communications system applied to the embodiments of this application is first briefly described with reference to FIG. 1. FIG. 1 is a schematic diagram of a system 100 applied to a data transmission method according to an embodiment of this application. The system shown in FIG. 1 may be a V2X direct communications system. As shown in FIG. 1, the communications system 100 includes at least two terminal devices, for example, a first terminal device 110 and a second terminal device 120, and may further include a third terminal device 130. The first terminal device 110 and the second terminal device 120 may communicate and interact with each other through a communications interface between the first terminal device 110 and the second terminal device 120, for example, exchange control signaling and/or service data, or exchange by carrying control signaling in service data. The communications interface between the first terminal device 110 and the second terminal device 120 may be a wireless direct communications interface (PC5 interface). Correspondingly, a link for performing transmission through the wireless direct communications interface is usually referred to as a sidelink. The second terminal device 120 and the third terminal device 130 may also perform similar communication and interaction through a communications interface between the second terminal device 120 and the third terminal device 130 (for example, through the direct wireless communications interface). It may be understood that the first terminal device 110 and the second terminal device 120 may directly communicate with each other through the wireless direct communications interface, and data transmitted between the two terminals does not need to be forwarded by a network side. The second terminal device 120 and the third terminal device 130 may directly communicate with each other, and data transmitted between the two terminal devices does not need to be forwarded by the network side. The system 100 further includes a radio access network device 140. As shown in FIG. 1, the radio access network device 140 and the first terminal device 110 may communicate and interact with each other through the wireless communications interface, for example, exchange control signaling and/or service data, or transmit control signaling carried in service data. The wireless communications interface between the radio access network device 140 and the first terminal device 110 may be a Uu interface. It may be understood that the radio access network device 140 and the second terminal device 120 may also communicate and interact with each other through a similar wireless communications interface between the radio access network device 140 and the second terminal device 120, and the radio access network device 140 and the third terminal device 130 may also communication and interact with each other through a wireless communications interface between the radio access network device 140 and the third terminal device 130. Details are not described herein again.

Figure 2:
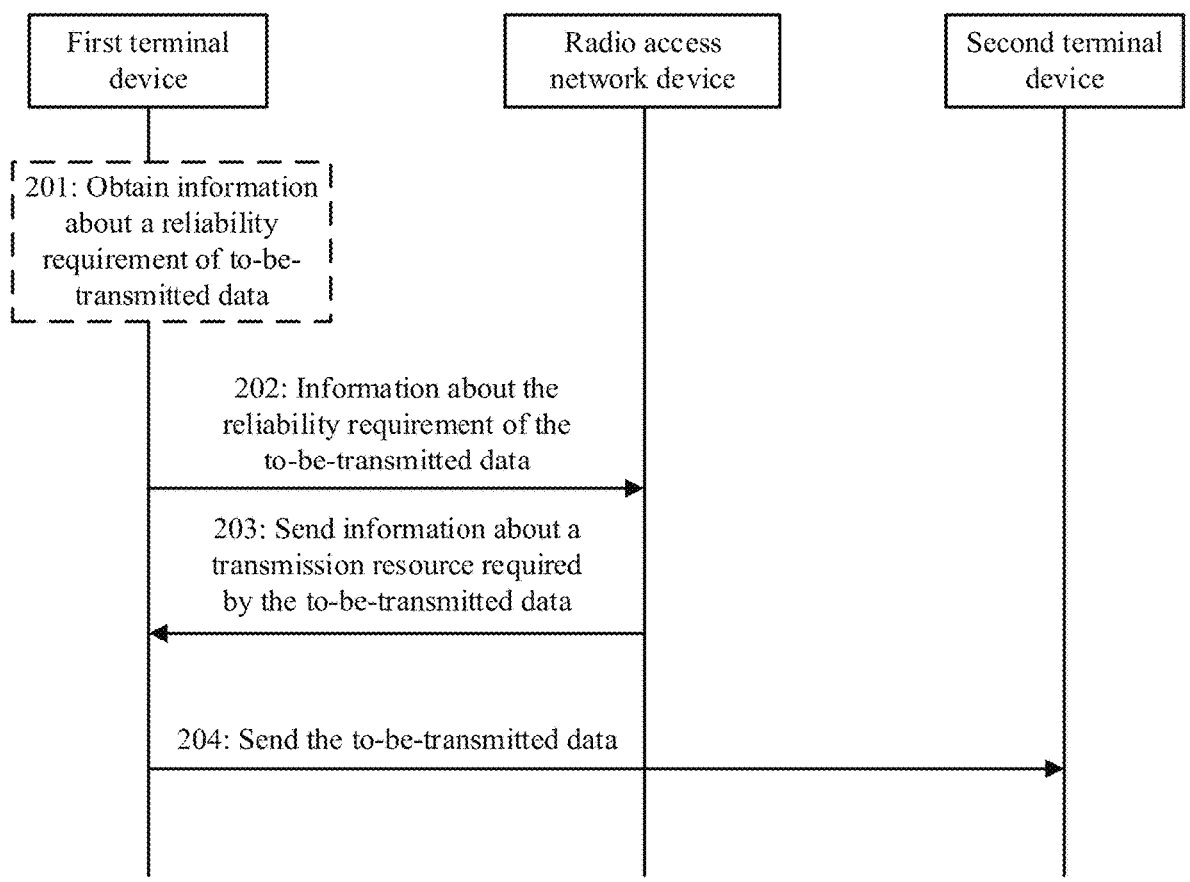
FIG. 2 is a schematic diagram of a data transmission method 200 according to an embodiment of this application.

As shown in FIG. 2, an embodiment of this application provides a data transmission method 200. The method 200 may run in the system 100 shown in FIG. 1, and relates to a first terminal device, a second terminal device, and a radio access network device. From a perspective of the first terminal device, an example of running the method 200 includes the following operations.

Operation 201: Obtain information about a reliability requirement of to-be-transmitted data.

This operation is optional. By using an example in which the first terminal device and the second terminal device are UE, the first terminal device is used as UE at a transmit end, and an access stratum (AS) of the UE at a data transmit end obtains the information about the reliability requirement of the to-be-transmitted data from an application layer of the UE.

It may be understood that the to-be-transmitted data in this embodiment is data to be sent by the first terminal device to the second terminal device through a wireless direct communications interface.

Specifically, in a feasible design, in addition to determining a PPPP value corresponding to the to-be-transmitted data (the value may reflect a latency requirement of the to-be-transmitted data), the application layer of the UE may further determine a transmission reliability requirement corresponding to the to-be-transmitted data. For example, a new index may be set to identify the reliability requirement of the to-be-transmitted data or a service of the UE at the transmit end. In a specific example, as shown in the following Table 1, five values may be set for the index, and each value corresponds to one transmission reliability requirement.

TABLE 1

| Index value | Reliability requirement |
|---|---|
| 1 | 90% |
| 2 | 95% |
| 3 | 99% |
| 4 | 99.99% |
| 5 | 99.999% |

It may be understood that a specific setting of the reliability index is not limited to the foregoing manner, and the index value may also have other different settings. For example, eight index values may be set to respectively correspond to different reliability requirements one by one, or three index values may be set to respectively correspond to different reliability requirements one by one. A higher index value of reliability indicates a higher reliability requirement. Certainly, a lower index value of reliability may also indicate a higher reliability requirement. This is not limited herein.

Based on the above, the application layer of the UE may determine the PPPP value and/or the index value of the reliability that are/is corresponding to the to-be-transmitted data, and send the PPPP value and/or the index value of the reliability that are/is corresponding to the service data independently, to the AS layer of the UE, or send the PPPP value and/or the index value of the reliability together with the service data to the AS layer of the UE, or carry the PPPP value and the index value of the reliability in the service data, and send the service data to the AS layer of the UE. Optionally, the UE may further determine that one logical channel on the sidelink is associated with one PPPP, and/or one logical channel on the sidelink is associated with, one index value of reliability. An advantage brought by this operation is that the application layer of the terminal device can transfer the reliability requirement of the to-be-transmitted data to the access stratum of the terminal device based on an actual reliability requirement of a service that needs to be performed, so that when processing data transmission to another terminal device, the access stratum of the terminal device can obtain a corresponding transmission resource based on the reliability requirement of the to-be-transmitted data, so that a system can be adapted to transmission reliability requirements of different service data.

Operation 202: The first terminal device sends the information about the reliability requirement of the to-be-transmitted data to the radio access network device.

In a feasible design of this operation, the first terminal device (used as the UE at the transmit end) sends the index value that is of the reliability and that corresponds to the to-be-transmitted data, to the radio access network device, for example, a base station. Specifically, the UE at the data transmit end may include the index value of the reliability in a sidelink buffer status report (BSR) and send the sidelink buffer status report to the base station. The UE may further send, based on a requirement, the PPPP value corresponding to to-be-transmitted data, and information about link quality or link load of the sidelink between the UE at the transmit end and UE at a receive end, to the base station. For example, the information about the link quality of the sidelink between the UE at the transmit end and the UE at the receive end may be carried in a radio resource control RRC message or a sidelink BSR and sent to the base station, the information about the link load of the sidelink may be carried in a radio resource control RRC message or a sidelink BSR and sent to the base station, or the information about the latency requirement of the to-be-transmitted data may be carried in a radio resource control. RRC message or a sidelink BSR and sent to the base station. It may be understood that in this design, messages or signaling that are used to send the information to the radio access network device are not limited. For example, related necessary information (at least one of the information about the reliability requirement of the to-be-transmitted data, the information about the link quality of the sidelink, the information about the link load of the sidelink, and the information about the latency requirement of the to-be-transmitted data) may be all carried in the slidelink BSR and sent to the radio access network device (for example, the base station).

Therefore, the base station may obtain, based on at least one of the following information, information about a transmission resource required for sending the to-be-transmitted data on the sidelink for a specified quantity of times, and/or determine a quantity of times required for sending the to-be-transmitted data on the sidelink: (1) the information about the transmission reliability requirement corresponding to the to-be-transmitted data, for example, the index value of the reliability, (2) information about load on a sidelink of a communications link between the UE at the transmit end and the UE at the receive end, (3) information about the link quality of the sidelink, and (4) information that can reflect the latency requirement or a scheduling priority of the to-be-transmitted data. For example, the information may be the PPPP, information corresponding to the PPPP, or the like. The radio access network device (for example, the base station) may quickly determine, based on the index value of the reliability, a quantity of times of transmitting the data on the sidelink and/or a transmission resource required for the specified quantity of transmission times. The radio access network device may further consider information about the load of the sidelink, information about the link quality, and the like, so that the base station can more properly and effectively determine the quantity of times of transmitting the to-be-transmitted data on the sidelink and/or allocate, to the to-be-transmitted data, a transmission resource required for the specified quantity of transmission times, and a current link status can be met. When determining the quantity of times of transmitting the to-be-transmitted data on the sidelink and/or allocating the transmission resource required for the specific quantity of transmission times, the base station may also consider a transmission latency requirement (for example, information related to a PPPP value) corresponding to the to-be-transmitted data. For example, if a service has a high transmission reliability requirement and a relatively low latency requirement, and the link load of the sidelink is relatively heavy or the link quality is relatively poor, to meet high reliability, a transmission resource may be configured for service data for a plurality of times, for example, five times. In this way, transmission reliability of the to-be-transmitted data on the sidelink can be properly improved. It may be understood that optionally, when the radio access network device considers any one or more of the following cases: link quality of the wireless direct communications interface is very good (for example, packet loss rarely occurs), load of the wireless direct communications interface is relatively light, and a low latency requirement of the to-be-transmitted data is very strict, the radio access network device may not determine, based on the information about the transmission reliability of the to-be-transmitted data, a quantity of times of transmitting the to-be-transmitted data on the sidelink and/or transmission resources required by the corresponding quantity of times of transmitting the to-be-transmitted data, or the radio access network device may determine, based on only any one or more of the following information, a quantity of times of transmitting the to-be-transmitted data and/or transmission resources required by the corresponding quantity of transmission times: information about load on the sidelink of the communications link between the UE at the transmit end and the UE at the receive end, information about the link quality of the sidelink, and information that can reflect the latency requirement or a scheduling priority of the to-be-transmitted data.

Figure 7:
FIG. 7 is a schematic diagram of a message format according to an embodiment of this application.

In a feasible design, an example in which the UE at the transmit end reports the information about the reliability requirement of the to-be-transmitted data to the base station through the sidelink BSR is used. 3 bits in the sidelink BSR message may be used to indicate the index value that is of the reliability and that corresponds to the to-be-transmitted data, or the three bits are used to indicate an expected quantity of times of transmitting the to-be-transmitted data on the sidelink, or the three bits are used to indicate both the index value that is of the reliability and that corresponds to the to-be-transmitted data and the expected quantity of times of transmitting the to-be-transmitted data on the sidelink. Certainly, there may also be another quantity of bits, for example, 1 bit, 2 bits, 4 bits, 5 bits, or the like. This is not limited herein. Specifically, a message that is of the sidelink BSR and that is applicable to carrying the information about the reliability requirement of the to-be-transmitted data may be designed in a format as shown in FIG. 7.

Retransmission Num indicates a quantity of times of transmitting the to-be-transmitted data, and the quantity of transmission times includes a quantity of times of initial transmission and a quantity of times of retransmission. The quantity of times of initial transmission is usually 1, and the quantity of times of retransmission may be 1 or more. Optionally, the quantity of transmission times may not be distinguished between the quantity of times of initial data transmission and a quantity of times of retransmission. Reliability ID indicates the information about the reliability requirement of the to-be-transmitted data, for example, may be an index value in a reliability index. Destination index indicates an index of a destination node address for communication on the sidelink. LCG ID indicates an identifier of a logical channel group. Buffer size indicates the buffer size. R indicates a reserved field. N information elements are shown in FIG. 7, where N is a natural number, and may be an odd number or an even number. This mainly depends on a quantity of UEs that receive the to-be-sent data on the sidelink. It may be understood that the foregoing provides only one structure of the message of the sidelink BSR. However, a specific structure of the message of the sidelink BSR is not limited in this embodiment of this application.

Operation 203: The radio access network device sends, to the first terminal device, the information about the transmission resource required for sending the to-be-transmitted data.

In a feasible design, the radio access network device (for example, the base station) sends at least one of the following information to the first terminal device (used as the UE at the data transmit end): information about a transmission resource required for sending the to-be-sent data on the sidelink between the UE at the data transmit end and the UE at the data receive end based on a specified quantity of sending times, and a quantity of times of sending the to-be-transmitted data to the receive end (namely, the second terminal device) on the sidelink. The information about the transmission resource required for sending the to-be-sent data based on the specified quantity of sending times may be determined by the radio access network device, or the quantity of sending times may be determined by the radio access network device, or both the information about the transmission resource required for sending the to-be-sent data based on the specified quantity of sending times and the quantity of sending times may be determined by the radio access network device. Either or both of the information about the transmission resource required for sending the to-be-sent data based on the specified quantity of sending times and the required quantity of sending times may be carried in downlink control information DCI and sent to the UE at the transmit end. For example, a data transmission resource on the sidelink and configured for the UE at the transmit end and/or the quantity of transmission times are/is sent to the UE by using DCI 5A. By using DCI of a physical layer message, the information about the transmission resource required for sending the to-be-transmitted data for the quantity of times specified by the radio access network device can be sent to the terminal device quickly and in real time, thereby ensuring efficiency of resource configuration and data transmission.

Operation 204: The first terminal device sends the to-be-transmitted data to the second terminal device.

In a feasible design, after the first terminal device (the UE at the transmit end) receives the information about the transmission resource required for sending the to-be-sent data on the sidelink based on the specified quantity of sending times, and/or the specified quantity of times of sending the to-be-transmitted data to the receive end (namely, the second terminal device) on the sidelink, the UE at the transmit end sends the to-be-transmitted data to the UE at the receive end on the sidelink based on the obtained transmission resource. If the obtained transmission resource may be used to perform data transmission for a plurality of times, the plurality of times of data transmission is performed based on the transmission resource that may be used to perform transmission for a plurality of times.

It may be understood that the radio access network device or the first terminal device (used as the UE at the transmit end) may send, to the second terminal device (used as the UE at the receive end), the information about the transmission resource (for example, a time-frequency resource) required for performing data transmission for a plurality of times on the slidelink, so that a terminal device at the receive end receives the to-be-transmitted data on the transmission resource.

Figure 3:
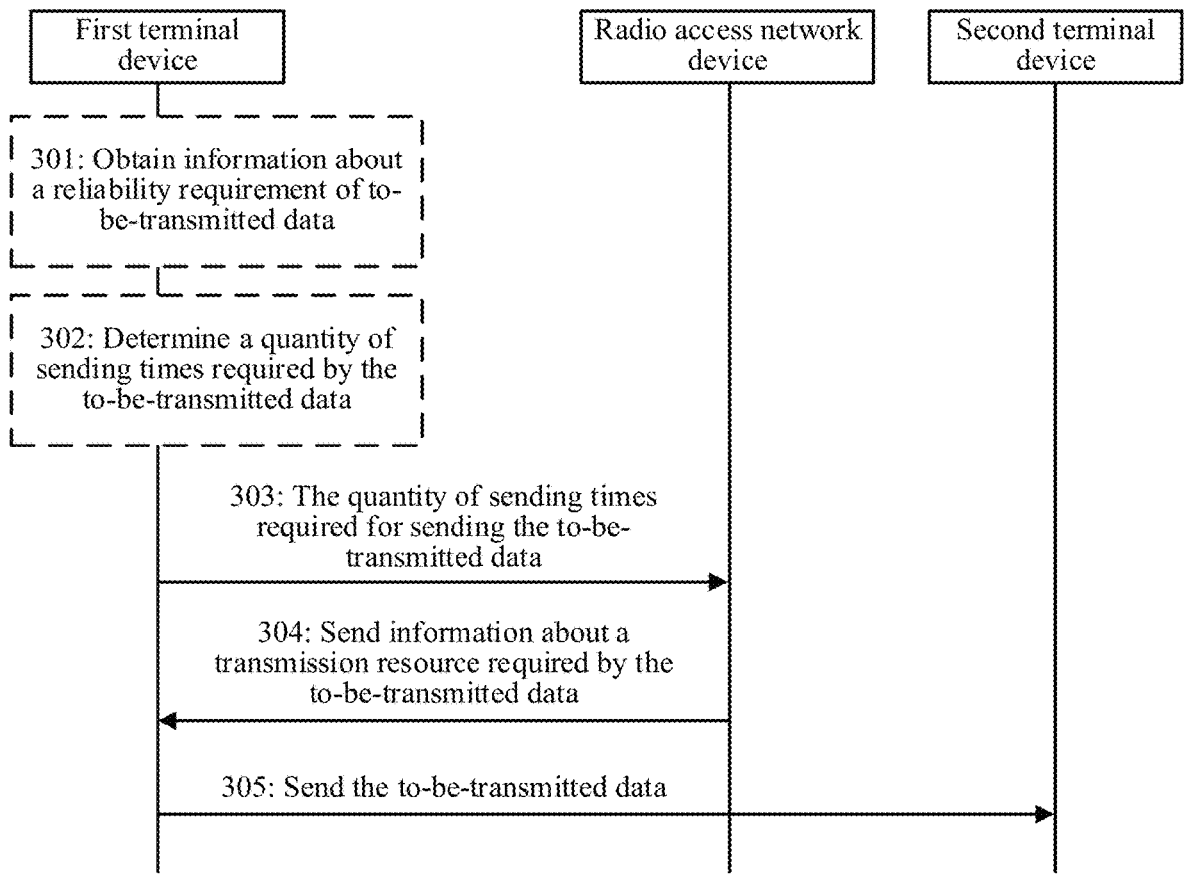
FIG. 3 is a schematic diagram of a data transmission method 300 according to an embodiment of this application.

As shown in FIG. 3, an embodiment of this application provides a data transmission method 300. The method 300 may run in the system 100 shown in FIG. 1, and relates to a first terminal device, a second terminal device, and a radio access network device. From a perspective of the first terminal device, an example of running the method 300 includes the following operations.

Operation 301: Obtain information about a reliability requirement of to-be-transmitted data.

This operation is optional. By using an example in which the first terminal device and the second terminal device are UE, the first terminal device is used as UE at a transmit end. In a feasible design, an access stratum (AS) of UE at a data transmit end obtains the information about the reliability requirement of the to-be-transmitted data from an application layer of the UE. It may be understood that the to-be-transmitted data in this embodiment is data to be sent by the first terminal device to the second terminal device through a wireless direct communications interface. Specifically, for execution and technical effects of the feasible design of this operation, refer to operation 201.

Operation 302: Determine a quantity of sending times required by the to-be-transmitted data.

This operation is optional. In a feasible design, the first terminal device used as the UE at the transmit end may determine, based on at least one of the following information, a quantity of times required for sending the to-be-transmitted data on a sidelink between the UE at the transmit end and UE at a receive end: (1) information about a transmission reliability requirement corresponding to the to-be-transmitted data, for example, an index value of reliability; (2) information about load on a sidelink of a communications link between the UE at the transmit end and the UE at the receive end; (3) information about link quality of the sidelink; and (4) information that can reflect a latency requirement or a scheduling priority of the to-be-transmitted data, for example, PPPP or information corresponding to the PPPP. Specifically, the first terminal device may quickly determine, based on the index value of the reliability, the quantity of times of transmitting the to-be-sent data on the sidelink and/or the transmission resource required for the specified quantity of transmission times. The first terminal device may further consider information about the load of the sidelink, information about link quality of the sidelink, and the like, so that the first terminal device (the UE at the transmit end) can more properly and effectively determine the quantity of times of transmitting the to-be-transmitted data on the sidelink and/or allocate, to the to-be-transmitted data, a transmission resource required for the specified quantity of transmission times, and a current link status is met. When determining the quantity of times required for transmitting the to-be-transmitted data on the sidelink and/or the transmission resource required for the specified quantity of transmission times, the UE at the transmit end may also consider a transmission latency requirement (for example, information related to a PPPP value) corresponding to the to-be-transmitted data. For example, if a service has a high transmission reliability requirement and a relatively low latency requirement, and the link load of the sidelink is relatively light or the link quality is relatively good, to meet high reliability, it is determined that service data may be transmitted for a plurality of times, for example, five times. In this way, transmission reliability of the to-be-transmitted data on the sidelink can be properly improved.

Operation 303: The first terminal device sends, to the radio access network device, information about a quantity of sending times required for sending the to-be-transmitted data.

In a feasible design of this operation, the first terminal device (used as the UE at the transmit end) sends the quantity of sending times required for sending the to-be-transmitted data, to the radio access network device (for example, a base station). Specifically, the UE at the data transmit end may include the information about the quantity of sending times in a sidelink buffer status report (BSR), and send the sidelink buffer status report to the base station. The UE may further send, based on a requirement, the PPPP value corresponding to to-be-transmitted data, and information about link quality or link load of the sidelink between the UE at the transmit end and UE at a receive end, to the base station. For example, the information about the link quality of the sidelink between the UE at the transmit end and the UE at the receive end may be carried in a radio resource control RRC message or a sidelink BSR and sent to the base station, the information about the link load of the sidelink may be carried in a radio resource control RRC message or a sidelink BSR and sent to the base station, or the information about the latency requirement of the to-betransmitted data may be carried in a radio resource control RRC message or a sidelink BSR and sent to the base station. It may be understood that in this design, messages or signaling that are used to send the information to the radio access network device are not limited. For example, related necessary information (at least one of the information about the reliability requirement of the to-be-transmitted data, the information about the link quality of the sidelink, the information about the link load of the sidelink, and the information about the latency requirement of the to-be-transmitted data) may be all carried in the slidelink BSR and sent to the radio access network device (for example, the base station).

In a feasible design, the UE at the transmit end may use one or more bits in a message of the sidelink BSR to indicate an expected quantity of times of transmitting the to-be-transmitted data on the sidelink. A specific quantity of bits is not limited herein.

Operation 304: The radio access network device sends, to the first terminal device, the information about the transmission resource required for sending the to-be-transmitted data.

In this operation, optionally, the radio access network device may allocate, based on at least one of the following information, the transmission resource required for sending the to-be-transmitted data on the sidelink based on the specified quantity of times: (1) information about a quantity of sending times required for sending the to-be-transmitted data; (2) information about load on a sidelink of a communication link between the UE at the transmit end and the UE at the receive end; (3) information about the link quality of the sidelink; and (4) information that can reflect a latency requirement or a scheduling priority of the to-be-transmitted data, for, example, may be PPPP or information corresponding to the PPPP. For a specific example, the radio access network device may directly configure, based on the information about the required quantity of sending times, the transmission resource required for transmitting the to-be-transmitted data on the sidelink. Optionally, the radio access network device may further consider load information of the sidelink, or consider link quality information of the sidelink, or consider the load information of the sidelink, the link quality information of the sidelink, and the like, so that the radio access network device can more properly and effectively determine the transmission resource required by the to-be-transmitted data on the sidelink, and a current link status is met. In an optional design, the radio access network device may further consider a, transmission latency requirement (for example, information related to a PPPP value) corresponding to the to-be-transmitted data. If a service has a very high transmission reliability requirement and a relatively low latency requirement, and a sidelink has relatively heavy load or relatively poor link quality, to meet high reliability, a resource for transmitting service data for a plurality of times may be configured, for example, five times. In this way, transmission reliability of the to-be-transmitted data on the sidelink can be properly improved.

The radio access network device (for example, the base station) sends, to the UE at the transmit end, information about the transmission resource required for sending the to-be-sent data on the sidelink based on a specified quantity of sending times. Specifically, the information about the transmission resource required for sending the to-be-sent data may be carried in downlink control information DCI and sent to the UE at the transmit-end. For example, the data transmission resource that is on the sidelink and that is configured for the UE at the transmit end is sent to the UE at the transmit end by using DCI 5A. By using DCI of a physical layer message, the information about the transmission resource required for sending the to-be-transmitted data for the quantity of times specified by the radio access network device can be sent to the terminal device quickly and in real time, thereby ensuring efficiency of resource configuration and data transmission.

According to this operation and any feasible design thereof, the terminal device notifies the radio access network device of the quantity of transmission times required by the data that needs to be transmitted on the wireless direct communications interface, so that the radio access network device can configure the transmission resource based on the quantity of transmission times required by the to-be-transmitted data, and send, to the terminal device, the required transmission resource used to perform transmission for the specified quantity of times. Therefore, reliability of transmitting data on the wireless direct communications interface is improved, and transmission reliability requirements of different services are met.

Operation 305: The first terminal device sends the to-be-transmitted data to the second terminal device.

In a feasible design, the first terminal device (the UE at the transmit end) sends the to-be-sent data on the sidelink based on the determined quantity of sending times. For example, if the transmission resource obtained by the UE at the transmit end may be used to perform data transmission for a plurality of times, the UE at the transmit end performs the data transmission for the plurality of times based on the transmission resource that can be used for transmission for a plurality of times.

It may be understood that the radio access network device or the first terminal device (used as the UE at the transmit end) may send, to the second terminal device (used as the UE at the receive end), the information about the transmission resource (for example, a time-frequency resource) required for performing data transmission for a plurality of times on the slidelink, so that a terminal device at the receive end receives the to-be-transmitted data on the transmission resource.

An embodiment of this application further provides a data transmission method 400.

Figures 1, 4:
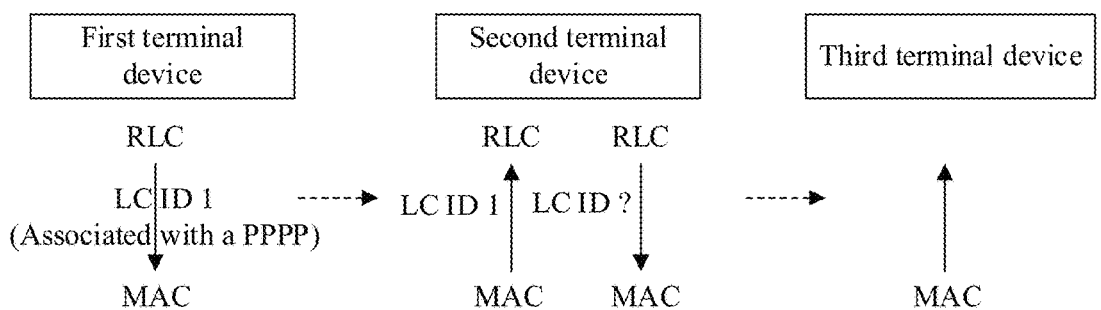
Figures 2, 4:
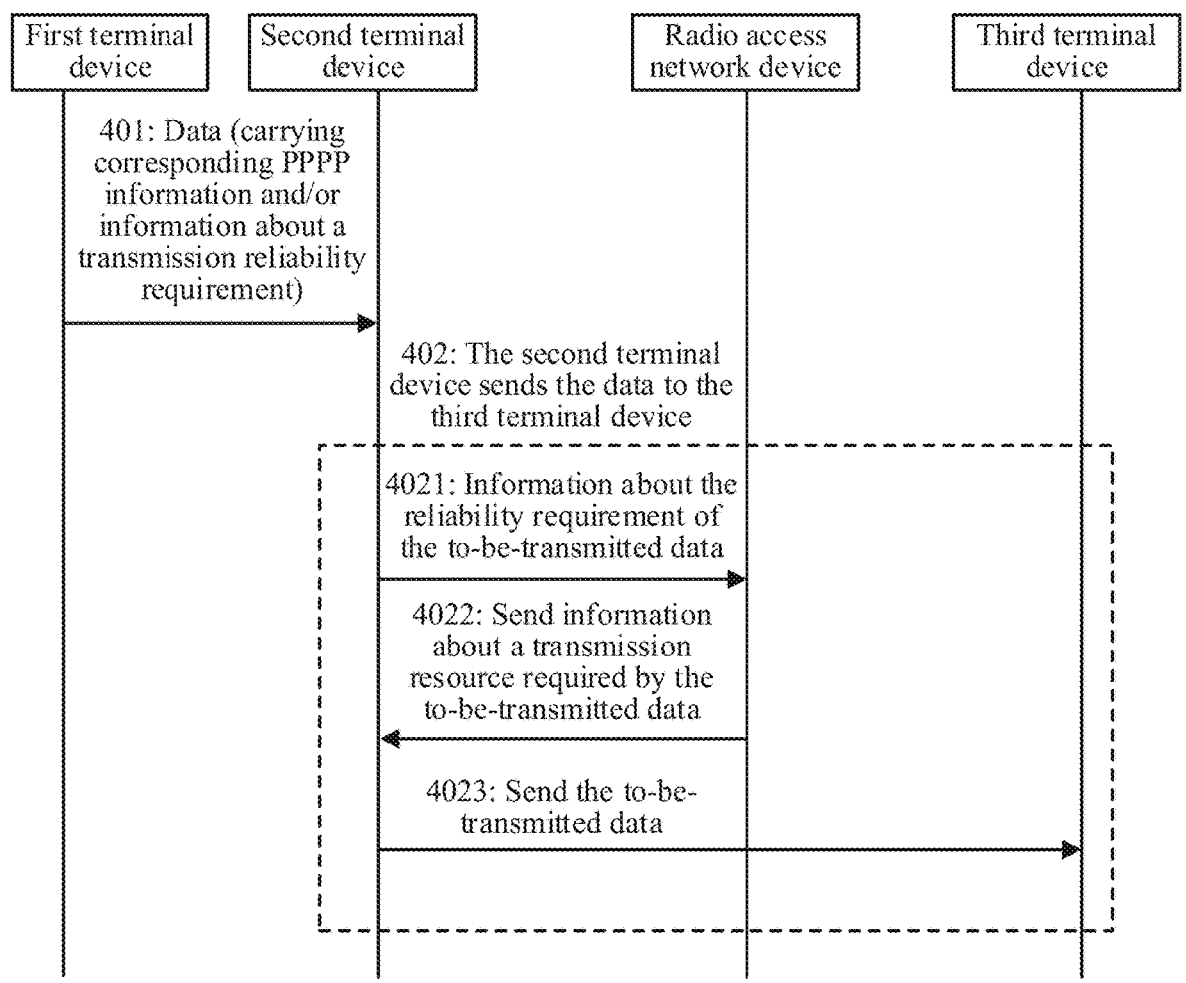

The method 400 may run in the system 100 shown in FIG. 1, and relates to a first terminal device, a second terminal device, a third terminal device, and a radio access network device. The method 400 helps improve transmission reliability between terminal devices, especially in a scenario in which to-be-transmitted data needs to be transmitted by a plurality of terminal device (which may also be referred to as a sidelink multi-hop scenario), for example, the second terminal device needs to send data from the first terminal device to the third terminal device. An example sidelink multi-hop scenario is shown in FIG. 4-1. The first terminal device is used as a data transmit end, and an application layer of the first terminal device adds PPPP information to data that needs to be sent to the third terminal device, and then sends the data to an AS layer of the first terminal device. During processing of radio link control (RLC) and media access control (MAC) at the AS layer of the first terminal device, the first terminal associates the PPPP information with one LCID and then sends the associated PPPP information to the second terminal device. For the second terminal, device, based on a MAC packet received by the second terminal device, the second terminal device can know an LCID from which the packet is received, but cannot know a quality of service (QoS) requirement corresponding to service data transmitted on the LCID. Therefore, the second terminal device cannot ensure that the data from the first terminal device is transmitted to the third terminal device based on a specified requirement. For example, the second terminal device cannot know an LC through which the data should be transmitted to the third terminal device. In this way, when the first terminal device sends the data to the third terminal device via the second terminal device, a transmission QoS requirement cannot be ensured. In view of this (optionally with reference to the method 200 corresponding to FIG. 1 in this application), as shown in FIG. 4-2, an example of running the data transmission method 400 provided in this embodiment includes the following operations.

Operation 401: The first terminal device sends the data to the second terminal device, where the data carries the PPPP information corresponding to the data and/or information about a transmission reliability requirement.

In a feasible design, the PPPP information corresponding to the data and/or the information about the transmission reliability requirement may be carried in a header field that is of a MAC layer and that is transmitted on the sidelink, or may be carried in a header field that is of a PDCP layer and that is transmitted on the sidelink for sending. A specific manner is not limited in this embodiment, provided that the second terminal device used as the UE at the receive end can know the PPPP information corresponding to the data received by the second terminal device and/or the information about the transmission reliability requirement. For example, the PPPP information may be a specific PPPP value, and the information about the transmission reliability requirement may be a reliability index shown in Table 1 of this application or a specific index value of reliability.

Operation 402: The second terminal device sends the data to the third terminal device.

The second terminal device sends the to-be-sent data to the third terminal device based on the PPPP information corresponding to the to-be-sent data and/or the information about the transmission reliability requirement.

In a feasible design, in operation 402, a mechanism for sending the data by the second terminal device to the third terminal device may be a method 200 or a method 300, or the method of sending the data by the first terminal device to the second terminal device in any one of the first aspect, the designs of the first aspect, the second aspect, and the designs of the second aspect in the summary. For example, operation 402 may include the following operations. Operation 4021: The second terminal device sends information about a reliability requirement of to-be-transmitted data to the radio access network device. Optionally, based on the information about the reliability requirement of the to-be-transmitted data, the radio access network device determines a quantity of times of transmitting the to-be-transmitted data on a sidelink between the second terminal device and the third terminal device and/or a required transmission resource. Operation 4022: The radio access network device sends the information about the transmission resource required for sending the to-be-transmitted data, to the second terminal device. Operation 4023: The second terminal device transmits the data to the third terminal device on the transmission resource that is allocated by the radio access network device and that is used to send the to-be-transmitted data. Alternatively, for example, operation 402 may include: sending, by the second terminal device to the radio access network device, information about a quantity of transmission times required by the to-be-transmitted data; determining, by the radio access network device based on the information about the quantity of transmission times required by the to-be-transmitted data, a transmission resource required by the to-be-transmitted data on the sidelink; sending, by the radio access network device to the second terminal device, information about the transmission resource required for sending the to-be-transmitted data on the sidelink; and transmitting, by the second terminal device, the data on the transmission resource allocated by the radio access network device. For specific implementation, in an optional design, refer to the method 200, the method 300, or any one of the first aspect, the designs of the first aspect, the second aspect, or the designs of the second aspect in the summary. Details are not described herein again.

It may be understood that by using operation 401 as an independent solution, the second terminal device used as a relay node is enabled to send the received data (and the reliability requirement and/or PPPP information of the received data) to the third terminal device, thereby enhancing transmission reliability of sending the data between multi-hop links. In combination with the operation 401, the operation 402 describes a solution from a perspective of an entire process.

For how to ensure a QoS requirement for data transmission in a multi-hop scenario, another feasible design includes: presetting a correspondence between an LCID and a PPPP for data transmission on the sidelink. For example, a PPPP whose value is 0 corresponds to a logical channel 0, a PPPP whose value is 1 corresponds to an LCID 1, and by analogy. For example, for the system shown in FIG. 4-1, the foregoing preset correspondence is applied, and the second terminal device used as an intermediate node may know the sending priority or the reliability requirement of the received data in the following manner: identifying an LCID of the received data; obtaining, based on the correspondence between the LCID and the PPPP, a relative priority of the data; forwarding the data by using a same sidelink LCID; and sending the received data to the third terminal device. It may be understood that optionally, a correspondence among the LCID, the PPPP, and the information about the transmission reliability requirement, or a correspondence between the LCID and the information about the transmission reliability requirement may be preset. In this way, the second terminal device used as the intermediate node may obtain the corresponding PPPP and/or the information about the transmission reliability requirement based on the LCID of the received data. Optionally, the information about the reliability requirement may alternatively be sent by the first terminal device to the second terminal device. Optionally, a mechanism for sending the data by the second terminal device to the third terminal device may be the method in operation 402 in FIG. 4-2, or the method 200 or the method 300 in the foregoing embodiments, or the method for sending the data by the first terminal device to the second terminal device in any one of the first aspect, the designs of the first aspect, the second aspect, or the designs of the second aspect in the summary.

It may be understood that optionally, the radio access network device or the second terminal device (used as the UE at the transmit end) may send, to the third terminal device, (used as the UE at the receive end), information about a transmission resource (for example, a time-frequency resource) required for performing data transmission for a plurality of times on the slidelink, so that a terminal device at the receive end receives the to-be-transmitted data on the transmission resource.

Figure 5:
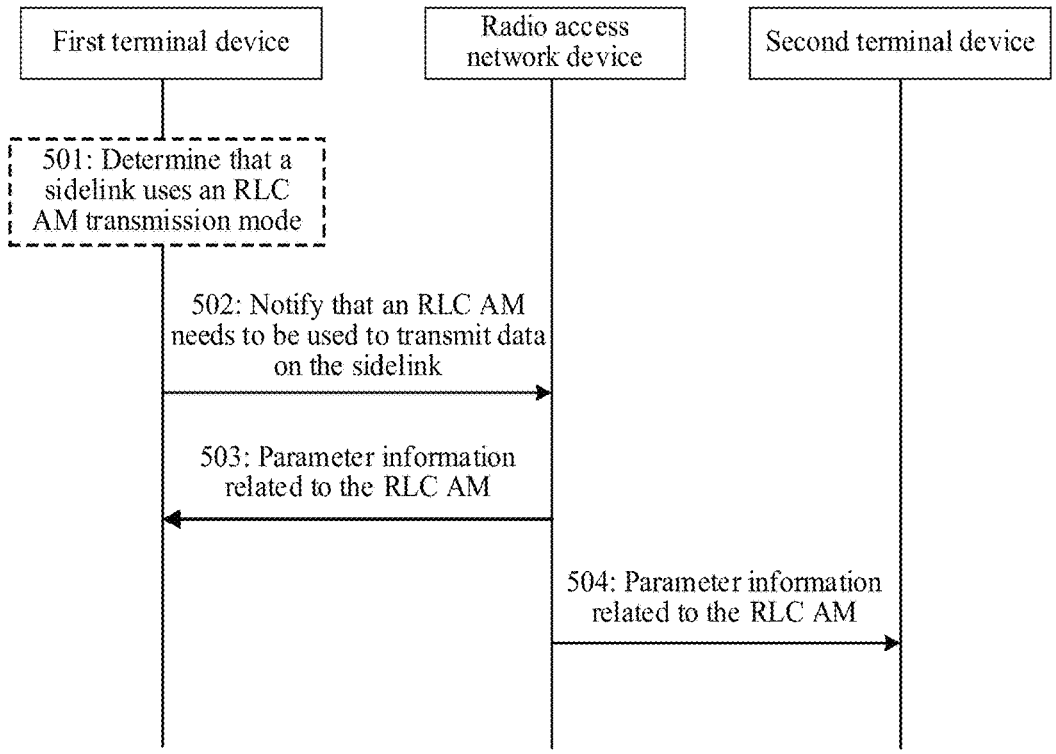
FIG. 5 is a schematic diagram of a data transmission method 500 according to an embodiment of this application.

As shown in FIG. 5, an embodiment of this application provides a data transmission method 500. An objective of implementing the method 500 is to improve transmission reliability on a sidelink. The method 500 may run in the system 100 shown in FIG. 1, and relates to a first terminal device, a second terminal device, and a radio access network device. For clarity, for example, in the method 500, the first terminal device is used as UE at a data transmit end, and the second terminal device is used as UE at a data receive end. An example of running the method 500 includes the following operations.

Operation 501: The first terminal device determines that an RLC acknowledged mode (AM) needs to be used to transmit data on a sidelink.

This operation is optional. A feasible design includes: obtaining, by an AS layer of the first terminal device from an application layer, information about a reliability requirement corresponding to to-be-transmitted data, and determining whether the RLC AM needs to be used for transmitting the data on the sidelink. For example, if the obtained reliability requirement corresponding to the to-be-transmitted data is relatively high, the first terminal device determines that the RLC AM needs to be used to transmit the data on the sidelink. For another example, if the AS layer of the first terminal device only needs to obtain information about the reliability requirement corresponding to the to-be-transmitted data, the first terminal device determines that the RLC AM needs to be used to transmit the data on the sidelink.

Operation 502: The first terminal device notifies the radio access network device that the RLC AM needs to be used to transmit the data on the sidelink.

In an optional design, as the UE at the transmit end, the first terminal device may notify, by using an RRC message or a MAC control element (MAC CE), the radio access network device (for example, a base station) that the RLC AM needs to be used to transmit the data on the sidelink. In this way, the base station may be requested, in this manner, to configure the RLC AM for transmitting the data on the sidelink. For example, the RRC message or the MAC CE may carry a sidelink logical channel identifier (sidelink LCID) corresponding to the data that is transmitted, and/or an indication requesting the RLC AM. Optionally, the RRC message or a MAC CE request may further carry destination address information (Destination ID) for data transmission.

Operation 503: The radio access network device sends, to the first terminal device, parameter information required for transmitting the data on a sidelink based on the RLC AM.

In an optional design, if the RLC AM on the sidelink triggers ARQ retransmission by using a polling mechanism, the radio access network device (for example, the base station) sends the parameter information related to the RLC AM on the sidelink, by using an RRC reconfiguration message to the first terminal device used as the UE at the data transmit end. For example, the base station may send the information to the UE at the data transmit end by carrying any one or more of the following information in the RRC reconfiguration message: a sidelink LCID, a maximum quantity of RLC retransmission times, pollByte (used to indicate a parameter that triggers polling after a quantity of bytes of data are sent by an RLC layer at the transmit end), pollSDU (used to indicate a parameter that triggers polling after a quantity of RLC SDUs are sent by the RLC layer at the transmit end), T-PollRetransmit (indicate a timer used to trigger polling retransmission), and T-reordering (indicate a tinier used to reorder at the receive end).

Operation 504: The radio access network device sends, to the second terminal device, the parameter information required for transmitting the data on the sidelink based on the RLC AM.

Optionally, in a process of accessing the radio access network device (for example, the base station), the first terminal device used as the UE at the transmit end reports the destination ID to the base station, so that the base station can associate a cell radio network temporary identifier (C-RNTI) of the UE with the destination ID. The base station may obtain a communication destination address of the sidelink by using the destination ID sent by the UE at the transmit end. If the UE at the receive end is also within a coverage range of the base station, the base station sends parameter information related to the RLC AM on the sidelink, by using the RRC message to the second terminal device used as the UE at the receive end. The parameters include any one or more of the following: a sidelink LCID, an enable-RCL AM (used to indicate indication information in which the RCL AM needs to be performed), and T-reordering. Optionally, if the UE at the receive end is not within the coverage range of the base station, the base station sends the information (any one or more of the following: the sidelink LCID, the enable-RCL AM, and the T-reordering) to the UE at the transmit end, namely, the first terminal device, then the UE at the transmit end sends the information to the UE at the receive end, namely, the second terminal device. A manner of sending the information may include: adding the information to the sent data, for example, adding the information to a header field of MAC of the sidelink or a header field of RLC, to indicate the UE at the receive end to use an RLC AM transmission mode. Alternatively, an RRC layer is introduced to the sidelink, and the information is carried in the RRC message on the sidelink, or is carried in the MAC CE on the sidelink; or is carried in an SCI format on the sidelink. It may be understood that a specific information sending manner is not limited in this embodiment of this application, provided that any one or more of the following information can be sent to the UE at the receive end: the sidelink LCID, the enable-RCL AM, and the T-reordering.

If the RLC AM on the sidelink triggers ARQ retransmission when HARQ on the MAC layer reaches a maximum quantity of retransmission times, in the method 500, an optional alternative 503-B to operation 503 includes the following operation.

In an optional design, a HARQ feedback mechanism needs to be designed for the MAC layer on the sidelink. For example, in the mode 3 resource allocation manner, when the base station allocates and sends, to the UE at the transmit end, a resource used for initial data transmission and retransmission, optionally, a time-frequency resource used for HARQ feedback further needs to be included. In this way, the UE at the transmit end notifies the UE at the receive end of both the initial transmission resource, the retransmission resource, and the time-frequency resource for HARQ feedback, so that the UE at the receive end does not need to apply to the base station for a sidelink resource before performing HARQ feedback, thereby reducing data transmission latency overheads.

For example, in this operation, the base station may send the parameter information related to the RLC AM on the sidelink, to the UE at the transmit end by using an RRC reconfiguration message. The parameter information includes any one or more of the following: the sidelink LCID, a maximum quantity of RLC retransmission times, and the T-reordering.

In the method 500, optionally, an optional alternative 504-B to operation 504 includes the following operation.

Optionally, the base station may obtain the communication destination address on the sidelink by using the destination ID carried in the request sent by the UE at the transmit end. If the UE at the receive end is also within the coverage range of the base station, the base station sends, to the UE at the receive end by using an RRC message, the parameter information related to the RLC AM on the sidelink. The parameter information includes any one or more of the following: the sidelink LCID, the enable-RCL AM, and the T-reordering. Optionally, if the target UE is not within the coverage range of the base station, the base station may send the information to the UE at the transmit end, and the UE at the transmit end notifies the UE at the receive end of the information. A specific notification manner is as follows. For example, the information may be carried in the sent data (for example, a header field of the MAC on the sidelink or a header field of an RLC, to indicate whether the UE at the receive end uses the RLC AM transmission mode). Alternatively, an RRC layer is introduced to the sidelink, and is carried in an RRC message on the sidelink; or is carried in a MAC CE on the sidelink; or is carried in an SCI format on the sidelink. Similarly, it may be understood that a specific information sending manner is not limited herein, provided that any one or more of the following information can be sent to the UE at the receive end: the sidelink LCID, the enable-RCL AM, and the T-reordering.

It should be noted that in this embodiment of this application, the base station may allocate SL-V-RNTI to user equipment in a V2X network, so that the UE at the transmit end and/or the UE at the receive end can identify that information sent by the base station through a Uu interface is used for transmission on the sidelink, to distinguish from the information used on the Uu interface.

In the implementations of the method 500, a first terminal device (UE AS at the transmit end) requests a base station to configure the RLC AM on the sidelink. The request message may be the RRC message or the MAC CE, and carries the sidelink LCID and an RLC AM request, or may further carry a destination ID. The base station allocates, to the UE at the transmit end and/or the UE at the receive end, parameters (any one or more of the sidelink LCID, a maximum quantity of RLC retransmission times, pollByte (indicate a parameter used to trigger polling after an RLC layer at the transmit end sends a quantity of bytes of data), poliSDU indicate a parameter used to trigger polling after an RLC layer at a transmit end sends a quantity of RLC SDUs), T-PollRetransmit (timer for triggering polling retransmission), the T-reordering (timer for reordering at the receive end), the sidelink LCID, the maximum quantity of RLC retransmission times, and the T-reordering (timer for reordering at the receive end) required by the RLC AM on the sidelink, so that data transmission on the sidelink may support a mechanism in which the RLC AM on the sidelink triggers ARQ retransmission by using a polling polling mechanism, or may support a mechanism in which ARQ retransmission is triggered by reaching a maximum quantity of HARQ retransmission times at the MAC layer by the RLC AM on the sidelink, thereby greatly improving reliability of data transmission on the sidelink.

An embodiment of this application provides a radio access network device. The radio access network device includes units configured to perform each method or action performed by the radio access network device in any one of the method 200, the method 300, the method 400, the method 500, and the designs of the methods. The units included in the radio access network device may be implemented in a software and/or hardware manner. It may be understood that in any method and design of the method in the embodiments of this application, each method, operation, or action that needs to be performed by the radio access network device may be implemented by corresponding software, hardware, or a unit module integrating software and hardware. The unit modules are used as a component of the radio access network device provided in this application.

An embodiment of this application provides a first terminal device. The first terminal device includes units configured to perform each method or action performed by the first terminal device in any one of the method 200, the method 300, the method 400, the method 500, and the designs of the methods. The units included in the first terminal device may be implemented in a software and/or hardware manner. To be specific, in any method and design of the method in the embodiments of this application, each method, operation, or action that needs to be performed by the first terminal device may be implemented by corresponding software, hardware, or a unit module integrating software and hardware. The unit modules are used as a component of the first terminal device provided in this application.

Figure 6:
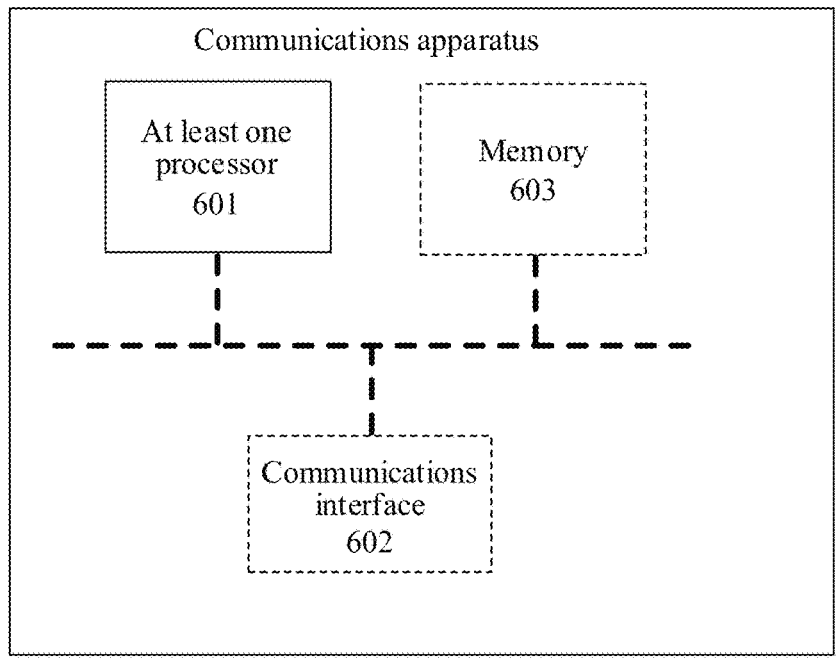
FIG. 6 is a schematic diagram of a communications apparatus 600 according to an embodiment of this application.

As shown in FIG. 6, this application further provides a communications apparatus 600. The communications apparatus includes at least one processor 601. The communications apparatus 600 may further include a communications interface 602. The communications interface 602 is used for communication and interaction between the communications apparatus 600 and another communications device (for example, a radio access network device or a terminal device, this is not limited herein). For example, control signaling and/or service data are/is exchanged. The communications interface 602 may be implemented by using a circuit having a communication receiving and sending function. When a program instruction is executed in the at least one processor, functions of the first terminal device, the radio access network device, or the second terminal device in any one of the method 200, the method 300, the method 400, the method 500, and the designs of the methods are implemented. Optionally, the communications apparatus 600 may further include a memory 603. The memory 603 is configured to store a required program instruction and/or data. Optionally, if the communications apparatus 600 is configured to implement a function of the terminal device, the communications interface 602 may also be designed as two circuits that have a communication receiving and sending function. The two circuits are respectively used for communication and interaction between the terminal device and the radio access network device and used for communication and interaction between the terminal device and another terminal device. Optionally, the communications apparatus 600 may be a vehicle in a transportation communications system (for example, V2X), or a communications apparatus or system that is installed in a vehicle, or a communications apparatus or system that is temporarily used for communication between the vehicle and the outside.

An embodiment of this application further provides a computer-readable storage medium. The computer-readable storage medium has program code. When the program code is executed, functions of the first terminal device, the radio access network device, or the second terminal device in any one of the method 200, the method 300, the method 400, the method 500, and the designs of the methods are implemented. For example, the computer-readable medium may include program code executed by the first terminal device. When being executed, the program code is used to implement functions of the first terminal device in any one of the method 200, the method 300, the method 400, the method 500, and the designs of the methods. For another example, the computer-readable medium may include program code executed by the radio access network device. When being executed, the program code is used to implement functions of the radio access network device in any one of the method 200, the method 300, the method 400, the method 500, and the designs of the methods. For another example, the computer-readable medium may include program code executed by the second terminal device. When being executed, the program code is used to implement functions of the second terminal device in any one of the method 200, the method 300, the method 400, the method 500, and the designs of the methods.

An embodiment of this application further provides a computer program product. The computer program product includes a program instruction. When the program instruction is executed, functions of the first terminal device, the radio access network device, or the second terminal device in any one of the method 200, the method 300, the method 400, the method 500, and the designs of the methods are implemented. For example, when the computer program product is executed on the first terminal device, the first terminal device is enabled to perform an operation of the first terminal device in any one of the method 200, the method 300, the method 400, the method 500, and the designs of the methods. For another example, when the computer program product is executed on the radio access network device, the radio access network device is enabled to perform an operation of the radio access network device in any one of the method 200, the method 300, the method 400, the method 500, and the designs of the methods.

An embodiment of this application further provides a system chip. The system chip includes at least one processor and an input/output interface. When an instruction is executed by the at least one processor, operations or functions of the first terminal device, the radio access network device, or the second terminal device in any one of the method 200, the method 300, the method 400, the method 500, and the designs of the methods are implemented. Optionally, the system chip may further include at least one memory and a bus, and the at least one memory is configured to store an instruction and/or data executed by the processor. It should be understood that the system chip in the embodiments of this application may further include another module or unit based on a requirement.

An embodiment of this application further provides a communications system. The communications system includes any one of the communications apparatus 600, the computer storage medium, the computer program product, and the system chip. Alternatively, the communications system includes any one or more of the first terminal device, the second terminal device, and the radio access network device.

It should be understood that the processor in the embodiments of this application may be a central processing unit (CPU), another general-purpose processor, a digital signal processor (DSP), an application-specific integrated circuit (ASIC), a field programmable gate array (FPGA), or another programmable logical device, discrete gate or transistor logical device, discrete hardware component, or the like. The general-purpose processor may be a microprocessor, or the processor may be any conventional processor or the like.

It should be further understood that in the embodiments of this application, the memory may be a volatile memory or a nonvolatile memory, or may include both a volatile memory and a nonvolatile memory. The nonvolatile memory may be a read-only memory (read-only memory, ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. In an example instead of limitation, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions or computer programs. When the computer instructions or the computer programs are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instruction may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "I" in this specification usually indicates an "or" relationship between the associated objects.

The terms "first", "second", and the like in this application are merely used to distinguish different objects, and "first" and "second" do not limit an actual sequence or functions of objects modified by "first" and "second". Expressions such as "example", "for example", "such as", "optional design", and "a design" in this application are merely used to represent examples, instances, or descriptions. Any embodiment or design scheme described as "example", "for example", "such as", "optional design", or "a design" in this application should not be explained as being more preferred or having more advantages than another embodiment or design scheme. Specifically, using these words is intended to present a related concept in detail.

Unless otherwise specified, an expression used in this application similar to an expression that "an item includes at least one of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and other combinations of A, B and C. The rest may be deduced by analogy.

Names may be assigned to various objects that may appear in this application, such as various messages/information/devices/network elements/systems/apparatuses/actions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application. A person of ordinary skill in the art may be aware that in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and another division manner may be used in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for indicating a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, applied to a first terminal device and comprising:
   sending, by the first terminal device, information about a transmission reliability requirement of to-be-transmitted data to a radio access network device through a wireless communications interface, wherein the to-be-transmitted data is to be sent by the first terminal device to a second terminal device through a wireless direct communications interface, wherein the wireless communications interface is between the first terminal device and the radio access network device, and wherein the wireless direct communications interface is between the first terminal device and the second terminal device; and
   receiving, by the first terminal device from the radio access network device, transmission resource information for sending the to-be-transmitted data on the wireless direct communications interface, wherein the transmission resource information comprises a quantity of times of transmitting the to-be-transmitted data on the wireless direct communications interface, or information about a transmission resource required for sending the to-be-transmitted data based on the quantity of times specified by the radio access network device, or a combination thereof.

2. The data transmission method according to claim 1, comprising:
   sending, by the first terminal device, first information to the radio access network device, wherein the first information is one or more of the following:
   information about link quality of the wireless direct communications interface, information about a load situation of the wireless direct communications interface, or information about a latency requirement of the to-be-transmitted data;
   wherein one or more of the information about the transmission reliability requirement of the to-be-transmitted data or the first information are used by the radio access network device to generate the information about the transmission resource required for sending the to-be-transmitted data based on the quantity of times specified by the radio access network device.

3. The data transmission method according to claim 1, wherein the first terminal device sends a buffer report of the wireless direct communications interface to the radio access network device, and wherein the buffer report of the wireless direct communications interface carries any one or more of the following information:

the information about the transmission reliability requirement of the to-be-transmitted data, information about link quality of the wireless direct communications interface, information about a load situation of the wireless direct communications interface, or information about a latency requirement of the to-be-transmitted data.

4. The data transmission method according to claim 1, wherein the first terminal device receives downlink control information from the radio access network device, and the downlink control information comprises the information about the transmission resource required for sending the to-be-transmitted data based on the quantity of times specified by the radio access network device.

5. The data transmission method according to claim 1, wherein the information about the transmission reliability requirement of the to-be-transmitted data is obtained by an access stratum entity of the first terminal device from an application layer entity of the first terminal device.

6. A data transmission method, applied to a radio access network device comprising:

receiving, by the radio access network device and through a wireless communications interface, information that is about a transmission reliability requirement of to-be-transmitted data and that is from a first terminal device, wherein the to-be-transmitted data is to be sent by the first terminal device to a second terminal device through a wireless direct communications interface, wherein the wireless communications interface is between the first terminal device and the radio access network device, and wherein the wireless direct communications interface is between the first terminal device and the second terminal device; and sending, by the radio access network device and to the first terminal device, transmission resource information needed for sending the to-be-transmitted data on the wireless direct communications interface, wherein the transmission resource information comprises a quantity of times of transmitting the to-be-transmitted data on the wireless direct communications interface, or information about a transmission resource required for sending the to-be-transmitted data based on the quantity of times specified by the radio access network device, or a combination thereof.

7. The data transmission method according to claim 6, comprising:

receiving, by the radio access network device, first information from the first terminal device, wherein the first information is one or more of the following: information about link quality of the wireless direct communications interface, information about a load situation of the wireless direct communications interface, or information about a latency requirement of the to-be-transmitted data; and generating, by the radio access network device and based on one or more of the information about the transmission reliability requirement of the to-be-transmitted data or the first information, the information about the transmission resource needed for sending the to-be-transmitted data based on the quantity of times specified by the radio access network device.

8. The data transmission method according to claim 6, wherein the radio access network device receives a buffer report of the wireless direct communications interface from the first terminal device, and wherein the buffer report of the wireless direct communications interface comprises one or more of the following:

information about transmission reliability requirement of the to-be-transmitted data, information about link quality of the wireless direct communications interface, information about a load situation of the wireless direct communications interface, or information about a latency requirement of the to-be-transmitted data.

9. An apparatus of a first terminal device and comprising:

at least one processor, and a memory storing instructions for execution by the at least one processor;

wherein, when executed, the instructions cause the apparatus to perform operations comprising:

sending, by the first terminal device, information about a transmission reliability requirement of to-be-transmitted data to a radio access network device through a wireless communications interface, wherein the to-be-transmitted data is to be sent by the first terminal device to a second terminal device through a wireless direct communications interface, wherein the wireless communications interface is between the first terminal device and the radio access network device, and wherein the wireless direct communications interface is between the first terminal device and the second terminal device; and receiving, by the first terminal device, transmission resource information that is sent by the radio access network device and that is needed for sending the to-be-transmitted data on the wireless direct communications interface, wherein the transmission resource information comprises a quantity of times of transmitting the to-be-transmitted data on the wireless direct communications interface, or information about a transmission resource required for sending the to-be-transmitted data based on the quantity of times specified by the radio access network device, or a combination thereof.

10. The apparatus according to claim 9, wherein, when executed, the instructions cause the apparatus to further perform operations comprising:

sending, by the first terminal device, first information to the radio access network device, wherein the first information is any one or more of the following:

information about link quality of the wireless direct communications interface, information about a load situation of the wireless direct communications interface, and information about a latency requirement of the to-be-transmitted data;

wherein one or more of the information about the transmission reliability requirement of the to-be-transmitted data or the first information are used by the radio access network device to generate the information about the transmission resource required for sending the to-be-transmitted data based on the quantity of times specified by the radio access network device.

11. The apparatus according to claim 9, wherein, when executed, the instructions cause the apparatus to perform operations comprising:

sending, by the first terminal device, a buffer report of the wireless direct communications interface to the radio access network device, and wherein the buffer report of the wireless direct communications interface carries one or more of the following information:

information about a transmission reliability requirement of the to-be-transmitted data, information about link quality of the wireless direct communications interface, the information about a load situation of the wireless direct communications interface, or information about a latency requirement of the to-be-transmitted data.

12. The apparatus according to claim 9, wherein, when executed, the instructions cause the apparatus to perform operations comprising:
receiving, by the first terminal device, downlink control information from the radio access network device, and wherein the downlink control information comprises the information about the transmission resource needed for sending the to-be-transmitted data based on the quantity of times specified by the radio access network device.

13. The apparatus according to claim 9, wherein the information about transmission reliability requirement of the to-be-transmitted data is obtained by an access stratum entity of the first terminal device from an application layer entity of the first terminal device.

14. An apparatus of a radio access network device and comprising:
at least one processor, and a memory storing instructions for execution by the at least one processor;
wherein, when executed, the instructions cause the apparatus to perform operations comprising:
receiving, by the radio access network device and through a wireless communications interface, information that is about a transmission reliability requirement of to-be-transmitted data and that is from a first terminal device, wherein the to-be-transmitted data is to be sent by the first terminal device to a second terminal device through a wireless direct communications interface, wherein the wireless communications interface is between the first terminal device and the radio access network device, and wherein the wireless direct communications interface is between the first terminal device and the second terminal device; and
sending, by the radio access network device and to the first terminal device, transmission resource information required for sending the to-be-transmitted data on the wireless direct communications interface, wherein the transmission resource information comprises a quantity of times of transmitting the to-be-transmitted data on the wireless direct communications interface, or information about a transmission resource required for sending the to-be-transmitted data based on the quantity of times specified by the radio access network device, or a combination thereof.

15. The apparatus according to claim 14, wherein, when executed, the instructions cause the apparatus to perform operations comprising:
receiving, by the radio access network device, first information from the first terminal device, wherein the first information is one or more of the following: information about link quality of the wireless direct communications interface, information about a load situation of the wireless direct communications interface, or information about a latency requirement of the to-be-transmitted data; and
generating, by the radio access network device and based on one or more of the information about the transmission reliability requirement of the to-be-transmitted data or the first information, the information about the transmission resource required for sending the to-be-transmitted data based on the quantity of times specified by the radio access network device.

16. The apparatus according to claim 14, wherein, when executed, the instructions cause the apparatus to perform operations comprising:
receiving, by the radio access network device, a buffer report of the wireless direct communications interface from the first terminal device, and wherein the buffer report of the wireless direct communications interface comprises one or more of the following:
the information about the transmission reliability requirement of the to-be-transmitted data, information about link quality of the wireless direct communications interface, information about a load situation of the wireless direct communications interface, or information about a latency requirement of the to-be-transmitted data.

* * * * *